US011760369B2

(12) United States Patent
Rodriguez Bravo et al.

(10) Patent No.: US 11,760,369 B2
(45) Date of Patent: *Sep. 19, 2023

(54) REMOTELY CONTROLLING USE OF FEATURES BASED ON AUTOMATIC VALIDATION REQUESTS

(71) Applicant: KYNDRYL, INC., New York, NY (US)

(72) Inventors: Cesar Augusto Rodriguez Bravo, Alajuela (CR); Gregory J. Boss, Saginaw, MI (US); Rick A. Hamilton, II, Charlottesville, VA (US)

(73) Assignee: Kyndryl, Inc., New York, NY (US)

( * ) Notice: Subject to any disclaimer, the term of this patent is extended or adjusted under 35 U.S.C. 154(b) by 347 days.

This patent is subject to a terminal disclaimer.

(21) Appl. No.: 17/178,358

(22) Filed: Feb. 18, 2021

(65) Prior Publication Data

US 2021/0171055 A1 Jun. 10, 2021

Related U.S. Application Data

(63) Continuation of application No. 16/042,233, filed on Jul. 23, 2018, now Pat. No. 10,967,880.

(51) Int. Cl.
*B60W 50/12* (2012.01)
*B60R 25/24* (2013.01)
(Continued)

(52) U.S. Cl.
CPC ............ *B60W 50/12* (2013.01); *B60R 25/04* (2013.01); *B60R 25/209* (2013.01); *B60R 25/24* (2013.01);
(Continued)

(58) Field of Classification Search
CPC ... B60W 50/12; B60W 2540/043; G07C 9/29; G07C 9/38; G06Q 20/401; B60R 25/24;
(Continued)

(56) References Cited

U.S. PATENT DOCUMENTS 7,266,507 B2 * 9/2007 Simon .................... G06Q 40/00
705/35
7,359,773 B2 * 4/2008 Simon ................. G07F 17/0057
705/13

(Continued)

FOREIGN PATENT DOCUMENTS

CN 104113552 10/2014

OTHER PUBLICATIONS

Mell, Peter et al. .; "The NIST Definition of Cloud Computing;" National Institute of Standards and Technology; Special Publication 800-145; Sep. 2011; 7 pages.
(Continued)

*Primary Examiner* — Thomas Ingram
(74) *Attorney, Agent, or Firm* — Erik Swanson; Hunter E. Webb; Keohane & D'Alessandro, PLLC

(57) ABSTRACT

A system and method for disabling a function of a feature of a vehicle based on a validation request to a centralized validation authority, prior to a use of the feature includes determining that a condition is met as part of a startup sequence of the vehicle, transmitting the validation request to the centralized validation authority, in response to determining the condition is met, wherein the validation request is part of the startup sequence of the vehicle, receiving a validation decision from the centralized validation authority, and disabling the feature of the vehicle as a function of the receiving the validation decision.

20 Claims, 12 Drawing Sheets

(51) Int. Cl.
  *B60R 25/20* (2013.01)
  *H04L 67/125* (2022.01)
  *H04W 4/46* (2018.01)
  *B60R 25/04* (2013.01)
  *G07C 9/29* (2020.01)
  *G06Q 20/40* (2012.01)

(52) U.S. Cl.
  CPC .......... *G06Q 20/4015* (2020.05); *G07C 9/29* (2020.01); *H04L 67/125* (2013.01); *H04W 4/46* (2018.02); *B60W 2540/043* (2020.02)

(58) Field of Classification Search
  CPC ..... B60R 25/209; B60R 25/04; H04L 67/125; H04W 4/46; H04W 4/80; H04W 4/44
  See application file for complete search history.

(56) References Cited

U.S. PATENT DOCUMENTS

| | | | | |
|---|---|---|---|---|
| 7,860,764 | B1* | 12/2010 | Alexander | G06Q 40/02 705/40 |
| 9,168,893 | B1* | 10/2015 | Schwartz | B60R 25/04 |
| 2002/0158778 | A1 | 10/2002 | Flick | |
| 2003/0030572 | A1 | 2/2003 | Simon | |
| 2007/0111709 | A1 | 5/2007 | De Luca et al. | |
| 2007/0299567 | A1 | 12/2007 | Simon et al. | |
| 2011/0215901 | A1 | 9/2011 | Van Wiemeersch et al. | |
| 2014/0277840 | A1 | 9/2014 | King | |
| 2015/0161832 | A1 | 6/2015 | Esselink et al. | |
| 2015/0172917 | A1 | 6/2015 | Teuwen et al. | |
| 2015/0298653 | A1 | 10/2015 | Schwartz | |
| 2016/0023635 | A1 | 1/2016 | Schwartz et al. | |
| 2017/0200331 | A1 | 7/2017 | Kumar et al. | |
| 2018/0091930 | A1 | 3/2018 | Jefferies | |
| 2018/0121903 | A1 | 5/2018 | Al Salah | |
| 2019/0147419 | A1 | 5/2019 | Terkel | |
| 2020/0023862 | A1 | 1/2020 | Rodriguez Bravo et al. | |

OTHER PUBLICATIONS

Al Vaughters, New Device Can Disable Cars With Late Payments, Oct. 22, 2014, Retrieved from Internet: URL: http://wivb.com/2014/10/22/car-wont-start-pay-your-loan/, 3 pages.

Late With Car Payment? The Bank Could Remotely Turn Off Your Vehicle Sep. 26, 2014, Retrieved from Internet: URL: http://www.autoblog.com/2014/09/26/repo-men-remotely-turn-off-cars-on-owners-late-with-payment/, 3 pages.

Office action dated Jun. 25, 2020; U.S. Appl. No. 16/042,233, filed Jul. 23, 2018.

Amendment filed Sep. 25, 2020; U.S. Appl. No. 16/042,233, filed Jul. 23, 2018.

Notice of Allowance dated Nov. 30, 2020; U.S. Appl. No. 16/042,233, filed Jul. 23, 2018.

* cited by examiner

REMOTELY CONTROLLING USE OF FEATURES BASED ON AUTOMATIC VALIDATION REQUESTS

This application is a continuation application claiming priority to Ser. No. 16,042,233, filed Jul. 23, 2018.

TECHNICAL FIELD

The present invention relates to systems and methods for remotely control a use of features of an object, and more specifically the embodiments of a validation system for disabling or enabling a function of a feature of an object based on a validation request to a centralized validation authority, prior to a use of the feature.

BACKGROUND

Remotely controlling features of a vehicle can be accomplished by sending signals from a remote server to the computer of the vehicle. The signals sent from a remote server can be avoided by evasive techniques, such as signal jamming, electromagnetic shielding, GPS jamming, and the like.

SUMMARY

An embodiment of the present invention relates to a method, and associated computer system and computer program product, for disabling a function of a feature of a vehicle based on a validation request to a centralized validation authority, prior to a use of the feature. A processor of a computer determines that a condition is met as part of a startup sequence of the vehicle. A validation request is transmitted to the centralized validation authority, in response to determining the condition is met, wherein the validation request is part of the startup sequence of the vehicle. A validation decision is received from the centralized validation authority. The feature of the vehicle is disabled as a function of the receiving the validation decision.

DETAILED DESCRIPTION

Figure 1:
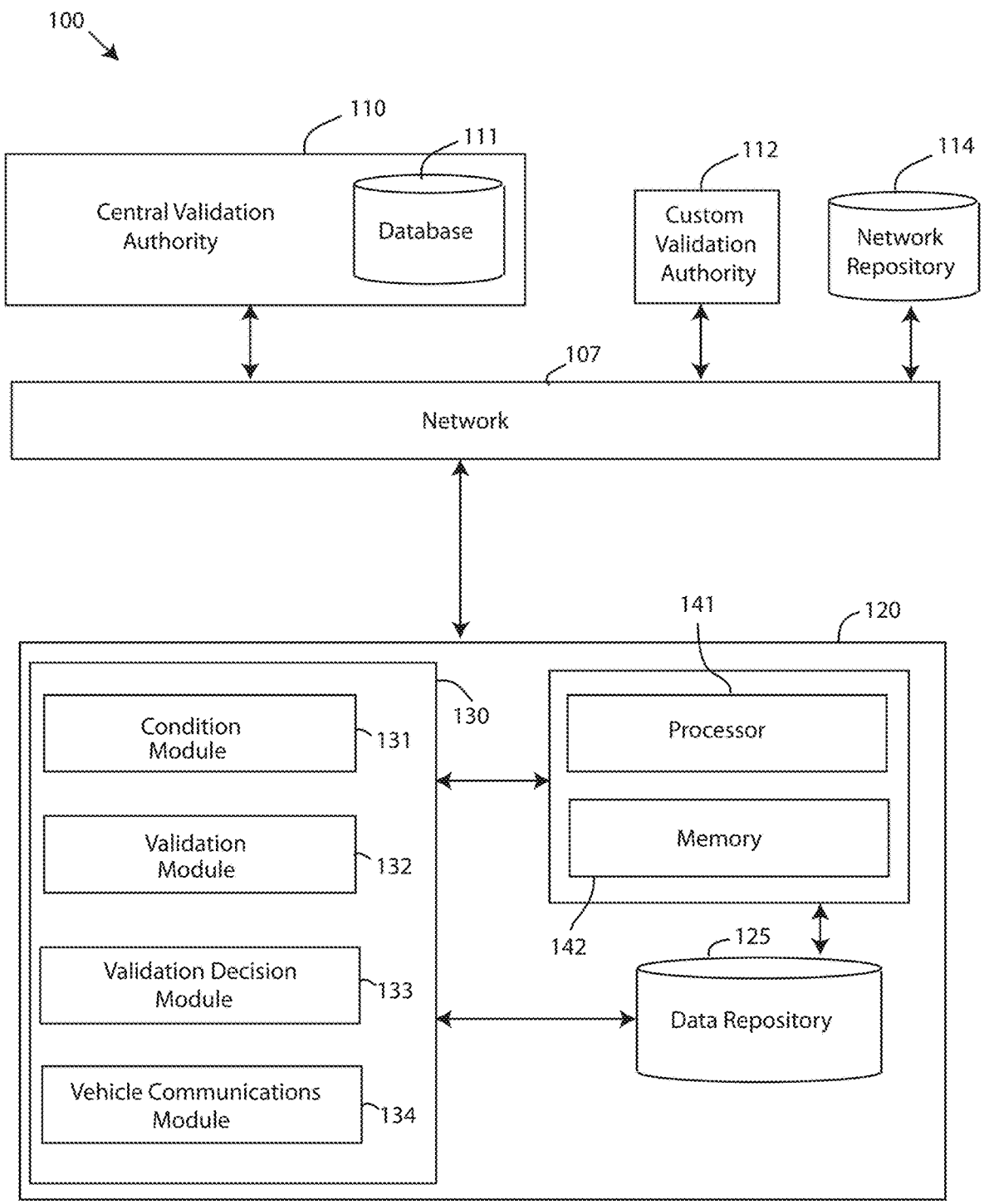
FIG. 1 depicts a block diagram of a validation system, in accordance with embodiments of the present invention.

Technology exists to assist in the location of vehicles, such as GPS receivers installed in the vehicle. However, GPS jammers can be used to bypass the GPS location technologies used to locate vehicles. Further, technology exists to remotely control features of vehicles, but the commands to remotely control a feature of a vehicle are incoming communications that can be easily ignored by shielding the onboard computer or device from receiving the signal. For example, the vehicle or object can implement evasive technologies to jam or shield incoming signals to block a remote control signal, and still use the vehicle or device features. Thus, there is a need for a system that requires the vehicle or object to periodically and automatically send a validation request to a central validation authority.

Embodiments of the present invention may include a computing system built-in to the vehicle or object that can be programmed to request validation from a validation authority every given number of days. The validation authority receives the validation request and verifies that a user associated with the vehicle or object has made the required payment. If the user has made required payments or fulfilled an obligation to a third party, the onboard computing system receives a validation acceptance and continues to enable a function of a feature of the object (e.g. onboard entertainment system of a vehicle). If the user has not made required payment or has not fulfilled an obligation to a third party, the onboard computing system receives a validation rejection and then disables a function of a feature of the object (e.g. access to movie library of onboard entertainment system). Accordingly, embodiments of the present invention may validate a user's authorization to use an electronic device, car, object, or features thereof, using cached authentication techniques.

Furthermore, embodiments of the present invention may have several advantages over the existing remote control techniques. For example, embodiments of the present invention discourage a use of signal shielding to block a signal being sent to the vehicle or object because the device, vehicle, or object needs the incoming validation acceptance to start/function. In other words, signal shielding prevents the validation request from reaching the validation authority. If the validation request is not sent, the computing system of the vehicle, object, device, etc. may not continue to enable the function of a feature because no validation acceptance has been received from the central validation authority. Additionally, embodiments of the present invention promote user interest in the system because the vehicle, device, object, etc. may not function without the implementation of the present invention. If a vehicle does not have Internet connectivity, then the present invention supports a vehicle-to-vehicle (V2V) network communication to a nearest vehicle for reaching the validation authority and receiving a validation decision. Due to the automatic validation process, management costs are significantly reduced. Further, embodiments of the present invention solve a technical problem associated with existing technologies used for locating and/or remotely controlling features of the vehicle or other devices. Existing technologies used for locating and/or remotely controlling vehicle or other devices can be thwarted using specific hardware, such as a GPS jammer or a signal jammer to block a transmission and receipt of an electronic signal to and from the vehicle or device.

Referring to the drawings, FIG. 1 depicts a block diagram of a validation system 100, in accordance with embodiments of the present invention. Embodiments of the validation system 100 may be a system for disabling or enabling a function of a feature of an object based on a validation request to a centralized validation authority, prior to a use of the feature. Embodiments of the validation system 100 is useful for lenders, content owners, banks, etc. that would like to encourage/incentivize users who have leased, financed, purchased on a subscription basis, or otherwise financed a vehicle or other device to make required payment. Additionally, the validation system 100 may be useful for countering evasive measures (e.g. signal jammers) employed by a user resisting remote control of the user's vehicle or device. For example, the validation system 100 may improve signal jamming counter measure technology by forcing the onboard computing to automatically send a signal at a scheduled time to maintain an enabled state of the vehicle, device, feature, etc. Furthermore, embodiments of the validation system 100 changes a physical state of the vehicle or device if a validation rejection is received. For instance, the computing system of a vehicle can cancel a command to provide electrical power to a circuit that controls an operation of a feature/hardware/software of the vehicle. The computing system of the vehicle thus withholds electrical power to a circuit that powers/implements a controller, motor, engine, electronic control unit, software, hardware, video monitor, etc. of the vehicle, if the validation request is rejected. In an exemplary embodiment, the validation system 100 is implemented in a vehicle, such as a car, truck, sport utility vehicle, crossover, sedan, coupe, van, recreational vehicle, boat, jet-ski, etc. However, the validation system 100 can be implemented for electronic devices, such as a cellular phone, smart television, computers, and the like.

Embodiments of the validation system 100 may be a validating system, a vehicle communication system, a device usage control system, a remote controlling system, an automatic validation system, a vehicle control system, a remote enabling and disabling system, and the like. Embodiments of the validation system 100 may include a computing system 120. Embodiments of the computing system 120 may be a computer system, a computer, one or more processing system, and the like, associated with a vehicle or electronic device. In an exemplary embodiment, the computing system 120 may be a built-in computing system of a vehicle, responsible for controlling the car electronics, electrical functions, and the like. In other embodiments, the computing system 120 may be the computing system of an electronic device associated with a user.

Furthermore, embodiments of validation system 100 may include a central validation authority 110 and a custom validation authority 112 that are communicatively coupled to the computing system 120 over a network 107. For instance, information/data/signals may be transmitted to and/or received from the central validation authority 110 and/or the custom validation authority 112 over a network 107. A network 107 may be the cloud. Further embodiments of network 107 may refer to a group of two or more computer systems linked together. Network 107 may be any type of computer network known by individuals skilled in the art. Examples of network 107 may include a LAN, WAN, campus area networks (CAN), home area networks (HAN), metropolitan area networks (MAN), an enterprise network, cloud computing network (either physical or virtual) e.g. the Internet, a cellular communication network such as GSM or CDMA network or a mobile communications data network. The architecture of the network 107 may be a peer-to-peer network in some embodiments, wherein in other embodiments, the network 107 may be organized as a client/server architecture.

In some embodiments, the network 107 may further comprise, in addition to the computing system 120, a connection to one or more network-accessible knowledge bases 114, which are network repositories containing information of the vehicle, user account, user, electronic device, counters, schedules, network repositories or other systems connected to the network 107 that may be considered nodes of the network 107. In some embodiments, where the computing system 120 or network repositories allocate resources to be used by the other nodes of the network 107, the computing system 120 and network-accessible knowledge bases 114 may be referred to as servers.

The network-accessible knowledge bases 114 may be a data collection area on the network 107 which may back up and save all the data transmitted back and forth between the nodes of the network 107. For example, the network repository may be a data center saving and cataloging information of the user, the vehicle, hardware, features, and the like, to generate both historical and predictive reports regarding a vehicle, electronic device, user payment history, user credit score, and the like. In some embodiments, a data collection center housing the network-accessible knowledge bases 114 may include an analytic module capable of analyzing each piece of data being stored by the network-accessible knowledge bases 114. Further, the computing system 120 may be integrated with or as a part of the data collection center housing the network-accessible knowledge bases 114. In some alternative embodiments, the network-accessible knowledge bases 114 may be a local repository that is connected to the computing system 120.

Embodiments of the central validation authority 110 may be a computing device, a computing system, a server, one or more servers, cloud service, and the like, which receives validations requests from computing system 120, interacts with one or more databases and platforms to verify a payment, usage, obligation, and the like, by a user, and sends a validation decision to the computing system, as described in greater detail infra. Based on the validation decision from the central validation authority 110, the computing system 120 may enable, continue to enable, disable, or continue to disable a feature and/or function of the vehicle (e.g. access to video content of an onboard entertainment system) or electronic device (e.g. cell receiver of smartphone). The central validation authority 110 may be connected to or include a database 111. The database 111, which may be accessed by the central validation authority 110, may be one or more databases, storage devices, repositories, and the like, that may store or otherwise contain information and/or data regarding a status of a loan, repayment plan, account balance, subscription terms, lease accounts, device payment plan, and the like. The database 111 may be accessed over network 107 or may be directly stored on one or more servers comprising the central validation authority 110. The database 111 may be affiliated with, managed, populated, and/or controlled by one or more financial institutions, issuers, authorizers, credit companies, lenders, content owners, associations, financial departments, and the like.

Embodiments of the validation system 100 may also include a custom validation authority 112. The custom validation authority 112 may be a computing system, a desktop computer, a smart phone, a tablet computer, or other Internet-connected device, or one or more servers servicing the user mobile device, etc. that is managed by a user for validation. The custom validation authority 112 may receive validation requests from computing system 120 and send validation decisions back to the computing system 120. However, instead of providing information regarding a status of a repayment for the vehicle or electronic device, the custom validation authority 112 may validate a custom, user programmed request. For example, the computing system 120 may send a validation request to the custom validation authority 112 to validate that the vehicle is within a certain geofence or proximity to an object. The custom validation authority 112 may obtain the GPS coordinates from the validation request to the custom validation authority 112 and verify that the coordinates are within a certain proximity of the user's smartwatch. If the validation cannot be confirmed, the computing system 120 may disable the engine start function of the user's vehicle to prevent damage to the vehicle in the event the user's vehicle is stolen. The custom validation requests may be made on a schedule (e.g. every week, every other day, etc.) that may be shorter than a typical billing cycle. Thus, if the vehicle is stolen, the validation rejection will be initiated sooner than waiting for the end of the next billing cycle. The custom validation authority 112 may also validate other custom requests, provided the information can be obtained by the custom validation authority 112. In an exemplary embodiment, the custom validation authority 112 is supported as a software application on the user's mobile device, wherein, when the vehicle, device, etc. sends a custom validation request, the user may interact with the user's mobile device to reject or accept/approve the validation request sent by the computing system 120. As an example, the user's boat's onboard computer (e.g. computing system 120) may automatically send a validation request that at least three lifejackets are on the boat when the boat ignition is turned into an on position. The validation request may be sent to the custom validation authority 112, which may be a cloud based service, which in turn sends a validation prompt to the user's cellular phone. The user interacts with the cellular phone to select "Approve" or "Reject." The user's cellular phone sends the signal back to the custom validation authority 112, which sends a validation rejection signal to the boat's computer. The boat's computer then disables the ignition start function, which may have been paused or otherwise stalled during the validation period, so that the boat cannot start until the user confirms that at least three lifejackets are on the boat. Thus, the custom validation authority 112 can be used for theft prevention and as a safety reminder, as well as many other applications.

Embodiments of the custom validation authority 112 may be a separate cloud service or cloud based computing system than the central validation authority 110, as shown in FIG. 1. In alternative embodiment, the central validation authority 110 services the user mobile device and the user custom validation requests. In other embodiments, the central validation authority 110 may be coupled to the custom validation authority 112 over a network to separately perform functions but also can communicate and/or share information.

Furthermore, embodiments of the computing system 120 of the validation system 100 may be equipped with a memory device 142 which may store various data/information/code, and a processor 141 for implementing the tasks associated with the validation system 100. In some embodiments, a validation application 130 may be loaded in the memory device 142 of the computing system 120. Embodiments of the validation application 130 may be an interface, an application, a program, a module, or a combination of modules. In an exemplary embodiment, the validation application 130 may be a software application running on the computing system 120, wherein a user interface portion of the software application may also run on a user mobile device or vehicle display.

Referring still to FIG. 1, the validation application 130 of the computing system 120 may include a condition module 131, a validation module 132, a validation decision module 133, and a vehicle communications module 134. A "module" may refer to a hardware-based module, software-based module or a module may be a combination of hardware and software. Embodiments of hardware-based modules may include self-contained components such as chipsets, specialized circuitry and one or more memory devices, while a software-based module may be part of a program code or linked to the program code containing specific programmed instructions, which may be loaded in the memory device of the computing system 120. A module (whether hardware, software, or a combination thereof) may be designed to implement or execute one or more particular functions or routines.

Embodiments of the condition module 131 may include one or more components of hardware and/or software program code for determining that a condition is met. A condition may be a condition, an occurrence, a state, a circumstance, a time of day, a day of the week, a period of days, and the like. In an exemplary embodiment, the condition is a period of days from a previous validation request sent to the centralized validation authority 110. For example, embodiments of the condition module 131 may include a counter or a tracking feature that may count or otherwise track a period of time measured from a previous validation request. The period of days may correspond to a billing cycle for repayment of borrowed or financed money to purchase the vehicle, electronic device, etc. In one exemplary embodiment, if a user is required to make a payment once a month by the $15^{th}$ of each month, and the current day is the $16^{th}$ day of the month, the condition module 131 may detect that a condition has occurred (i.e. the $15^{th}$ of the month has passed, with a one-day buffer). The condition may also correspond to a usage of the vehicle or other electronic device. In another exemplary embodiment, if a user has rented a car for three days, and three days have passed from original rental date, the condition module 131 may detect that a condition has occurred (i.e. three days have passed since original rental date). Moreover, embodiments of the condition module 131 may detect that a condition has been met or has occurred at a time when a user attempts to start, turn on, use, etc. a function or feature of the vehicle or other electronic device. In an exemplary embodiment, the condition module 131 determines whether a condition is met as part of a startup sequence of the vehicle. For example, as the user initiates a startup sequence to turn on the engine of the car, the condition module 131 may run various checks to determine if a condition is met (e.g. has it been 30 days since last validation request?). The condition module 131 may halt a startup sequence so that the vehicle's engine may not start turning or start functioning until the completion of the validation, if the condition is met. If a condition is not met, the condition module 131 may allow the startup sequence to proceed as normal. In another exemplary embodiment, the condition module 131 determines whether a condition is met when a user each time a user launches a predetermined software application (e.g. browser application) on the user mobile device. The condition module 131 may prevent the application from launching until the completion of the validation, if the condition is met. If power is constantly provided to the electronic device, for example, the condition module 131 may determine whether a condition is met at programmed intervals.

Embodiments of the computing system 120 may include a validation module 132. Embodiments of the validation module 132 may include one or more components of hardware and/or software program code for transmitting a validation request to the centralized validation authority 110, in response to determining the condition is met. For instance, the validation module 132 may automatically transmit a signal, communication, electronic message, etc. to the central validation authority 110, if the condition is met. In an exemplary embodiment, the validation request is required to be sent from the computing system 120 to the central validation authority 110 automatically if the period of days from a previous or initial validation request corresponds to the predetermined number of days allowed between validation requests. The predetermined number of days may correspond to a billing cycle, wherein the user must make a required payment within the allowed time between validation requests. Moreover, in exemplary embodiment, the validation request is a request that the central validation authority 111 verify a status (e.g. current, late, default, etc.) of a payment required to made by a user for the vehicle or electronic device being financed, leased, etc. by the user. For instance, the validation request being sent by the computing system 120 (e.g. vehicle computer) seeks to validate that the user can still operate the vehicle or electronic device, or a feature thereof, based on whether the user has missed any payments or exceeded an allowable number of missed payments. The validation request may at a time when a user attempts to start, turn on, use, etc. a function or feature of the vehicle or other electronic device, in response to detecting that the condition is met (e.g. the regular interval to send a validation request). In an exemplary embodiment, the validation module 131 send the validation request as part of a startup sequence of the vehicle. For example, as the startup sequence is halted so that the vehicle's onboard entertainment functions do not function until the completion of the validation, the validation module 132 may send the validation request to the central validation authority 110 (or custom validation authority 112). In another exemplary embodiment, the validation module 132 may transmit a validation request as a software application is being prevented from launching until the completion of the validation. If power is constantly provided to the electronic device, for example, the validation module 132 may transmit validation requests at programmed and/or predetermined intervals.

Referring back to FIG. 1. embodiments of the computing system 120 may include a validation decision module 133. Embodiments of the validation decision module 133 may include one or more components of hardware and/or software program for receiving a validation decision from the centralized validation authority 110. For instance, embodiments of the validation decision module 133 may receive a validation decision from the central validation module 110 after the validation request has been processed. Similarly, the validation decision module 133 may receive a validation decision from the custom validation authority 112 after the custom validation authority 112 processes the validation request, as described supra.

The central validation authority 110 may, in response to receiving the validation request, may determine a status of the repayment of the borrowed/leased amount. To determine a status of the repayment instrument, embodiments of the central validation module 110 may retrieve, receive, obtain, derive, etc. a repayment status from a database 111. Embodiments of the database 111 may be one or more databases, storage devices, repositories, and the like, that may store or otherwise contain information and/or data regarding a repayment account associated with a user. The database 111 may be accessed over network 107 or directly from the servers operating the central validation authority 110, and may be affiliated with, managed, and/or controlled by one or more financial institutions, issuers, authorizers, and the like. The central validation authority 110 may query the payment database 111 to determine whether or not the user has made a required payment associated with the repayment plan for the vehicle or electronic device. In some embodiments, the central validation authority 110 may also send a request to a financial institution to determine a validity of the payment made (if made). Additionally, the central validation authority 110 may access a transactions records database (not shown) to retrieve or otherwise receive a transaction information or history to confirm/verify whether a payment has been on time. Further, embodiments of the central validation authority 110 sends a validation decision (e.g. "Acceptance" or "Rejection") back to the computing system 120.

Figure 2:
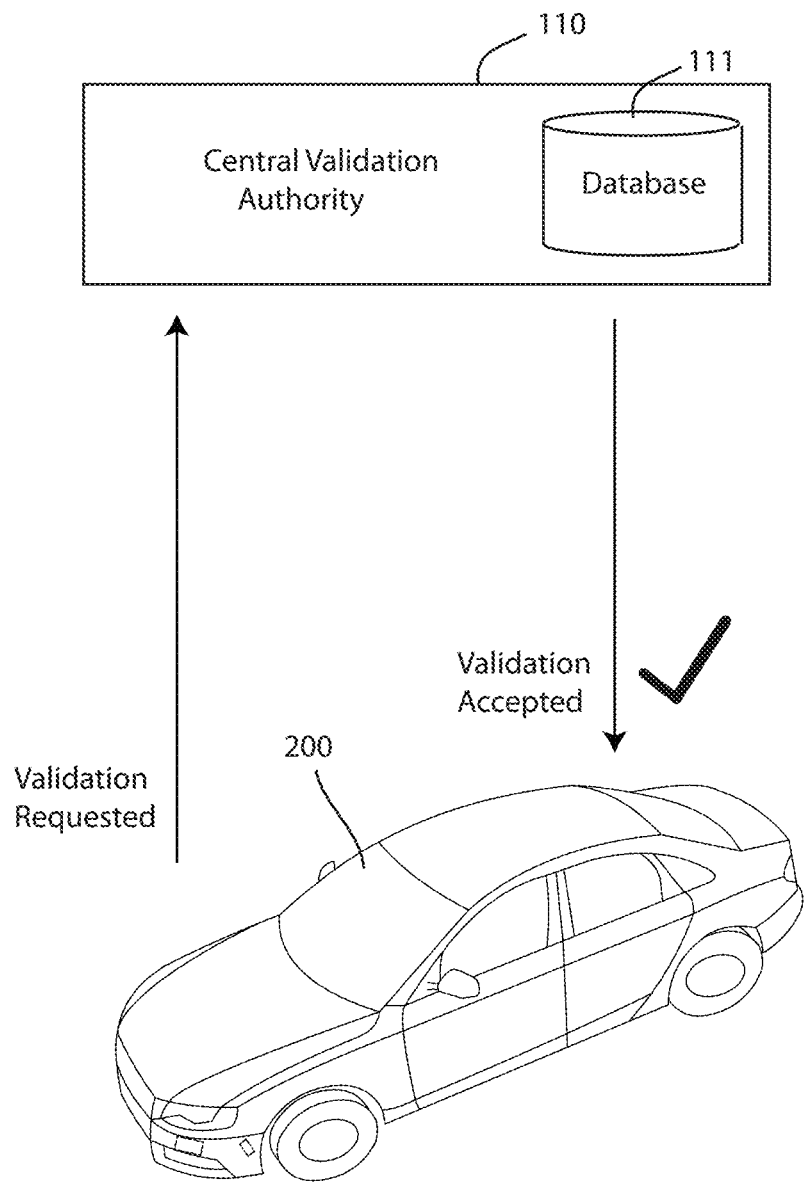
FIG. 2 depicts a schematic diagram of a vehicle sending a validation request and receiving a validation acceptance, in accordance with embodiments of the present invention.

FIG. 2 depicts a schematic diagram of a vehicle 200 sending a validation request and receiving a validation acceptance, in accordance with embodiments of the present invention. While a vehicle is shown in FIG. 2, embodiments of the validation system 100 may be implemented for electronic devices and other Internet-connected devices that may be remotely enabled or disabled in response to automatically sending a validation request as described above. In FIG. 2, a vehicle computer (e.g. computing system 120) built into the vehicle 200 sends a validation request to the central validation authority 110. After processing the validation request, the central validation authority 110 returns a "Validation Accepted" or "Validation Approved" signal to the vehicle computer. Because the validation decision from the central validation authority is a validation acceptance, the validation decision module 120 of the computing system 120 (e.g. vehicle computer) enables (or maintains an enabled state) a function of a feature of the vehicle 200. Embodiments of a feature of the vehicle 200 is an engine, a navigation software, a satellite radio, an onboard entertainment system, a streaming service, car electronics, an electronic control unit, and the like. For instance, the enabling by the validation module 133 may be a continued processing of a command to load up new video content through the onboard entertainment system as part of a startup sequence, such that electric power is directed to a circuit, control module, and the like, which powers the onboard entertainment system. In another embodiment, the enabling by the validation module 133 may be turning on (e.g. powering a circuit or providing a power supply) a satellite antenna to receive a satellite radio, after the central validation authority 110 has verified a valid and/or timely payment for satellite radio, or may be enabling a circuit dedicated to displaying the navigation software on an in-vehicle display. In another embodiment, the enabling by the validation module 133 may be turning on (e.g. powering a circuit or providing a power supply) a circuit controlling the starting of the engine, after the central validation authority 110 has verified a valid and/or timely payment for the vehicle.

Figure 3:
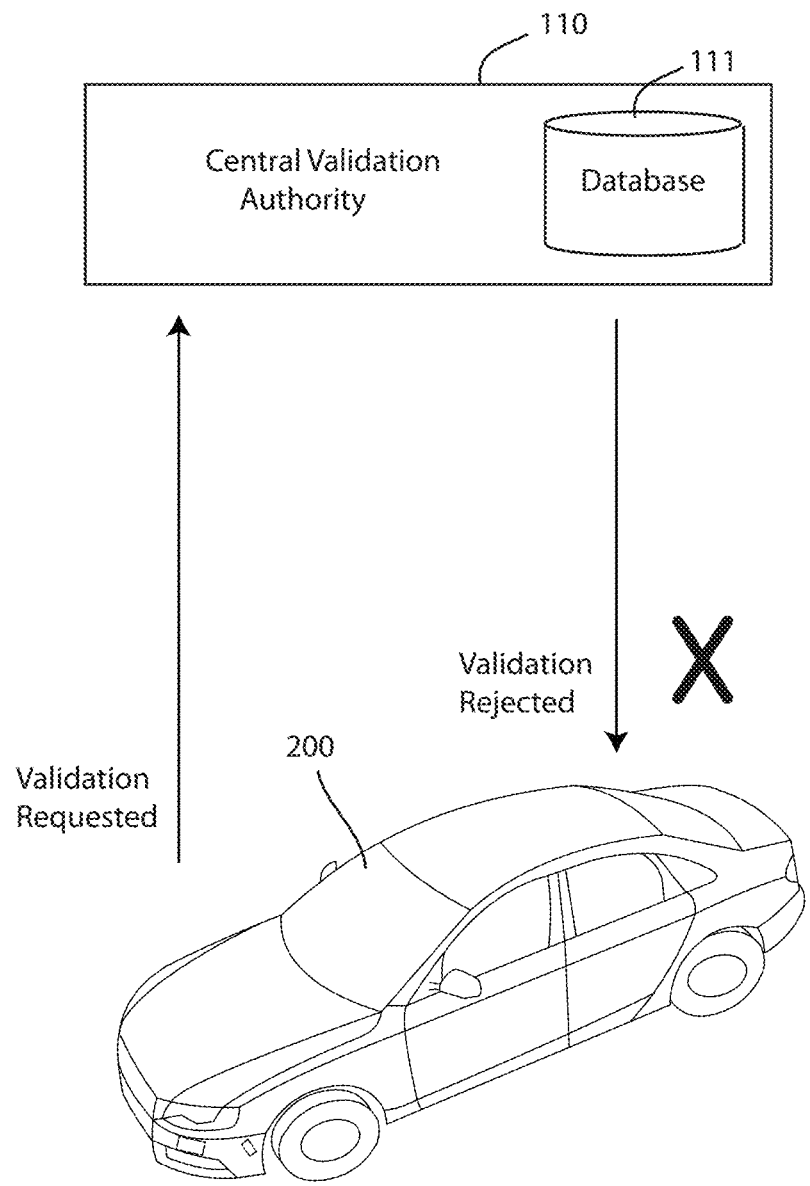
FIG. 3 depicts a schematic diagram of a vehicle sending a validation request and receiving a validation rejection, in accordance with embodiments of the present invention.

FIG. 3 depicts a schematic diagram of a vehicle 200 sending a validation request and receiving a validation rejection, in accordance with embodiments of the present invention. While a vehicle is shown in FIG. 3, embodiments of the validation system 100 may be implemented for electronic devices and other Internet-connected devices that may be remotely enabled or disabled in response to automatically sending a validation request as described above. In FIG. 3, a vehicle computer (e.g. computing system 120) built into the vehicle 200 sends a validation request to the central validation authority 110. After processing the validation request, the central validation authority 110 returns a "Validation Rejected" or "Validation Denied" signal to the vehicle computer. Because the validation decision from the central validation authority is a validation rejection, the validation decision module 120 of the computing system 120 (e.g. vehicle computer) disables (or maintains a disabled state) a function of a feature of the vehicle 200. Embodiments of a feature of the vehicle 200 that can be disabled is an engine, a navigation software, an onboard entertainment system, a satellite radio, a streaming service, car electronics, an electronic control unit, and the like. For instance, the disabling by the validation module 133 may be cancelling a processing of a command to load new content of an onboard entertainment system, such that electric power is not provided to a circuit, control module, and the like, which powers the onboard entertainment system. The disabling of the vehicle 200 or a feature of the vehicle 200 may result in a feature of the vehicle 200 being unable to operate. In another embodiment, the disabling by the validation module 133 may be turning off (e.g. disabling a circuit or power supply) a satellite antenna to receive a satellite radio, after the central validation authority 110 has verified an invalid and/or untimely payment for satellite radio, or may be disabling a circuit dedicated to displaying the navigation software on an in-vehicle display. In another embodiment, the disabling by the validation module 133 may be turning off (e.g. disabling a circuit or a power supply) a circuit controlling the starting of the engine, after the central validation authority 110 has verified an invalid and/or untimely payment for the vehicle.

In embodiments involving the enabling/disabling the engine, the computing system 120 may withhold or delay the disabling based on an emergency or other event, even if a validation rejection is received. For instance, the computing system 120 may enable a functioning of a feature rather than disable the functioning of the feature if the computing system 120 determines that an emergency requires the functioning of the feature, or another event, such as a partial payment has been made, or a one-time forgiveness pass applies. The computing system 120 may also issue a warning that the user is behind in payments, in response to receiving a validation rejection, but nevertheless enable the engine so that the user can use the vehicle, for safety of the user. The computing system 120 can disable a luxury feature of the vehicle instead, such as access to newly available content of an onboard computing system, as opposed to disabling the starting/running of the vehicle. The computing system 120 can determine whether the vehicle is in motion so as to not enable or disable any function of a feature while the user is driving, which could jeopardize the safety of the user and any passengers. In an exemplary embodiment, the computing system 120 allows the user to input a request to ignore the validation rejection based on an emergency or time-sensitive situation. The computing system 120 can, in cases of a non-emergency, but time-sensitive situation, confirm the urgency of need to use the vehicle (e.g. cold weather conditions, time of day, user's schedule, etc.) Further, the computing system 120 may permit delays if a partial payment is made.

Figure 4:
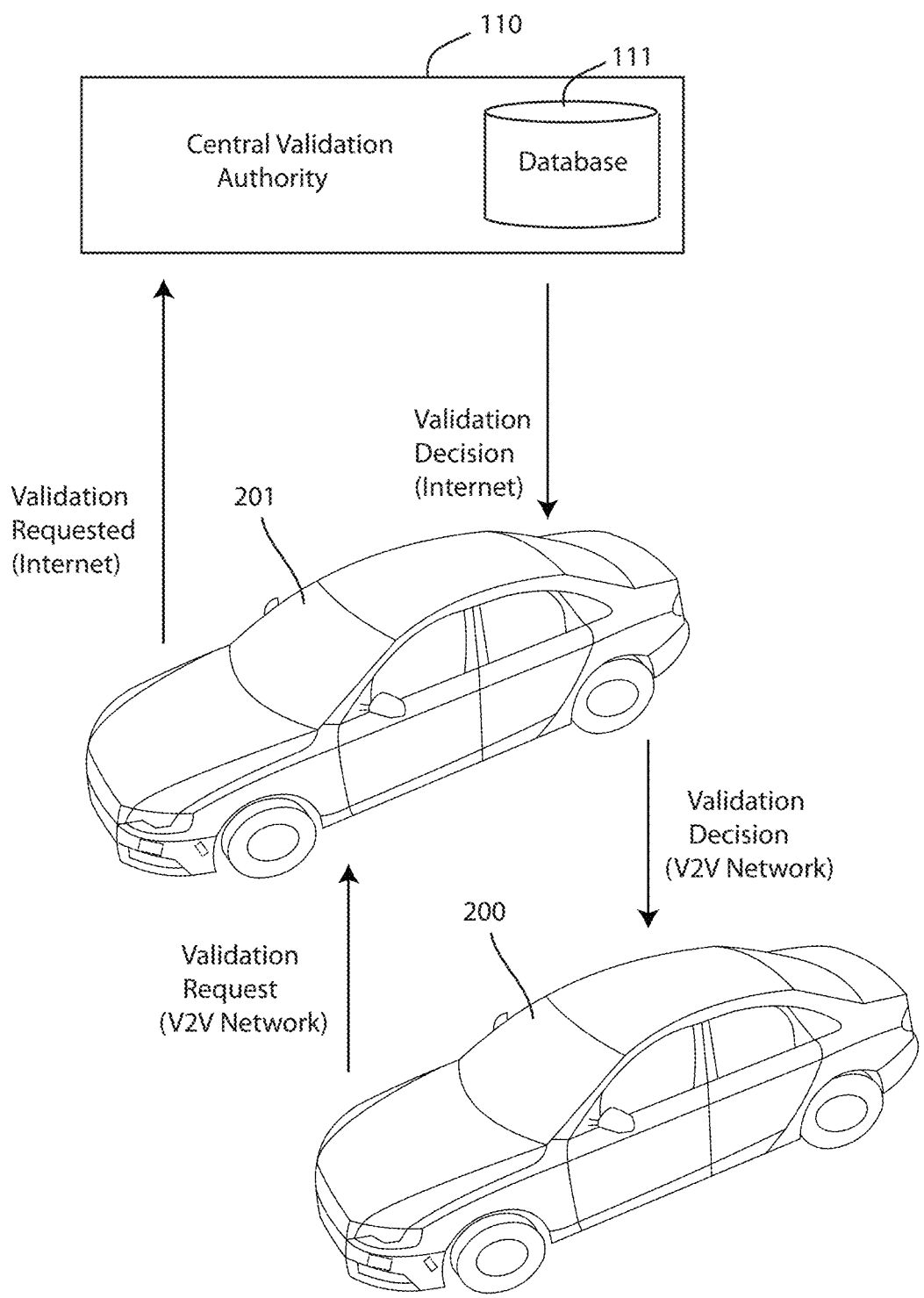
FIG. 4 depicts a schematic block diagram of a vehicle communicating with a neighboring vehicle over a vehicle-to-vehicle (V2V) network, and the neighboring vehicle communicating with the central validation authority, in accordance with embodiments of the present invention.

Embodiments of the computing system 120 may include a vehicle communications module 134. Embodiments of the vehicle communications module 134 may include one or more components of hardware and/or software program for supporting a vehicle-to-vehicle (V2V) network communication to a nearest vehicle for reaching the validation authority and receiving a validation decision, if the vehicle 200 does not have Internet connectivity. FIG. 4 depicts a schematic block diagram of a vehicle 200 communicating with a neighboring vehicle 201 over a vehicle-to-vehicle (V2V) network, and the neighboring vehicle 201 communicating with the central validation authority 110, in accordance with embodiments of the present invention. Embodiments of the vehicle communications module 134 of the computing system 120 installed in vehicle 200 may detect that the vehicle cannot connect to the Internet to transmit the validation request over a traditional network. If the vehicle 200 is determined to not have a connection to the Internet or does not have a connection reliable enough for transmitting the validation request, the vehicle communication module 134 may locate a nearest or at least another vehicle 201 that has a connection to the Internet. The vehicle communications module 134 may then send the validation request to the nearest vehicle 201 over the V2V network, wherein the nearest vehicle 201 transmits the validation request to the centralized validation authority 110 on behalf of the vehicle 200 over the Internet, receives the validation decision from the centralized validation authority 110 over the Internet, and sends the validation decision to the vehicle 200 over the V2V network. The computing system 120 of the vehicle 200 may then disable or enable a function and/or feature of the vehicle 200 depending on the validation decision. Embodiments of the V2V network may allow communication between vehicles on a separate network than network 107 described above. The V2V network may support radio frequency communication, short range communication network communication, and the like.

Figure 5:
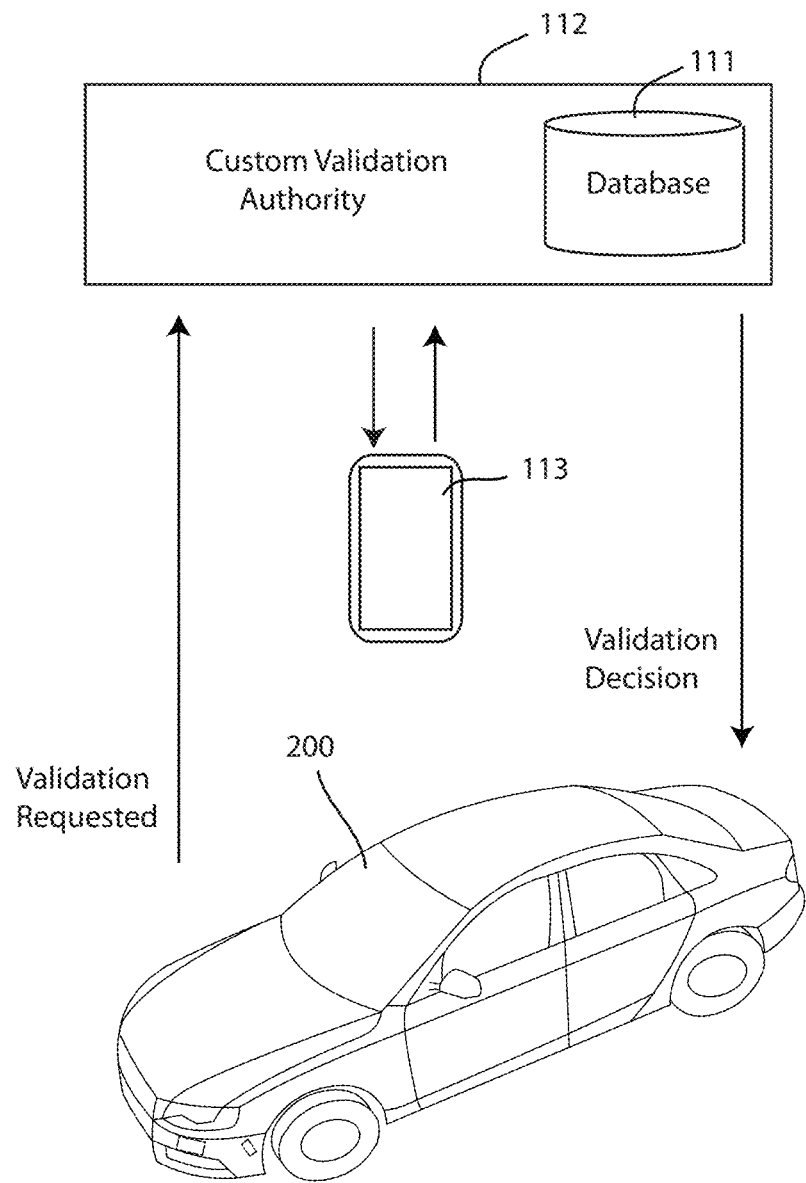
FIG. 5 depicts a schematic diagram a vehicle sending a validation request and receiving a validation rejection from a custom validation authority, in accordance with embodiments of the present invention.

FIG. 5 depicts a schematic diagram a vehicle 200 sending a validation request and receiving a validation rejection from a custom validation authority 112, in accordance with embodiments of the present invention. The vehicle 200 sends a validation request based on custom parameters and conditions, to the custom validation authority 112 over network 107. The custom validation authority may receive the validation request and process various data and information received from the vehicle 200, depending on the custom validation request. The custom validation authority 112 sends the validation request and potentially useful information to a user mobile device 113 (e.g. smartphone, tablet, etc.) or a user computing device, such as a laptop, desktop computer, virtual assistant, etc., to prompt the user to either "Accept" or "Reject" the validation request from the vehicle 200. The user mobile device 113, which is separate from the computing system 120 of the vehicle 200, transmits the decision signal to the custom validation authority 112, which then transmits the validation decision signal back to the vehicle 200.

Various tasks and specific functions of the modules of the computing system 120 may be performed by additional modules, or may be combined into other module(s) to reduce the number of modules. Further, embodiments of the computer or computer system 120 may comprise specialized, non-generic hardware and circuitry (i.e., specialized discrete non-generic analog, digital, and logic-based circuitry) (independently or in combination) particularized for executing only methods of the present invention. The specialized discrete non-generic analog, digital, and logic-based circuitry may include proprietary specially designed components (e.g., a specialized integrated circuit, such as for example an Application Specific Integrated Circuit (ASIC), designed for only implementing methods of the present invention). Moreover, embodiments of the validation system 100 improves evasive countermeasure technology by requiring the vehicle or electronic device to automatically send an electronic message to continue to use a feature of the vehicle or electronic device. Because the electronic message (i.e. validation request) is required to be sent, a user may not employ signal jammers to jam outgoing signals or shield incoming signals that are traditionally used to remotely control features of a vehicle or electronic device.

Furthermore, the validation system 100 physically changes a state of a vehicle, depending on a validation decision. Various circuitry, control modules/units, motors, actuators, processors, etc. may be disabled or otherwise prevented from operating to enable a function of the vehicle or electronic device. For example, an onboard vehicle computer may prevent a closing of a circuit or open a circuit that requires to be closed to perform a mechanical function of the vehicle. Embodiments of the validation system 100 provides a technical solution to the above-drawbacks by remotely controlling a usage or function of the vehicle or electronic device by physically disabling electrical circuits or electromechanical components to prevent a physical, electrical, and/or mechanical function of the vehicle or electronic device.

Figure 6:
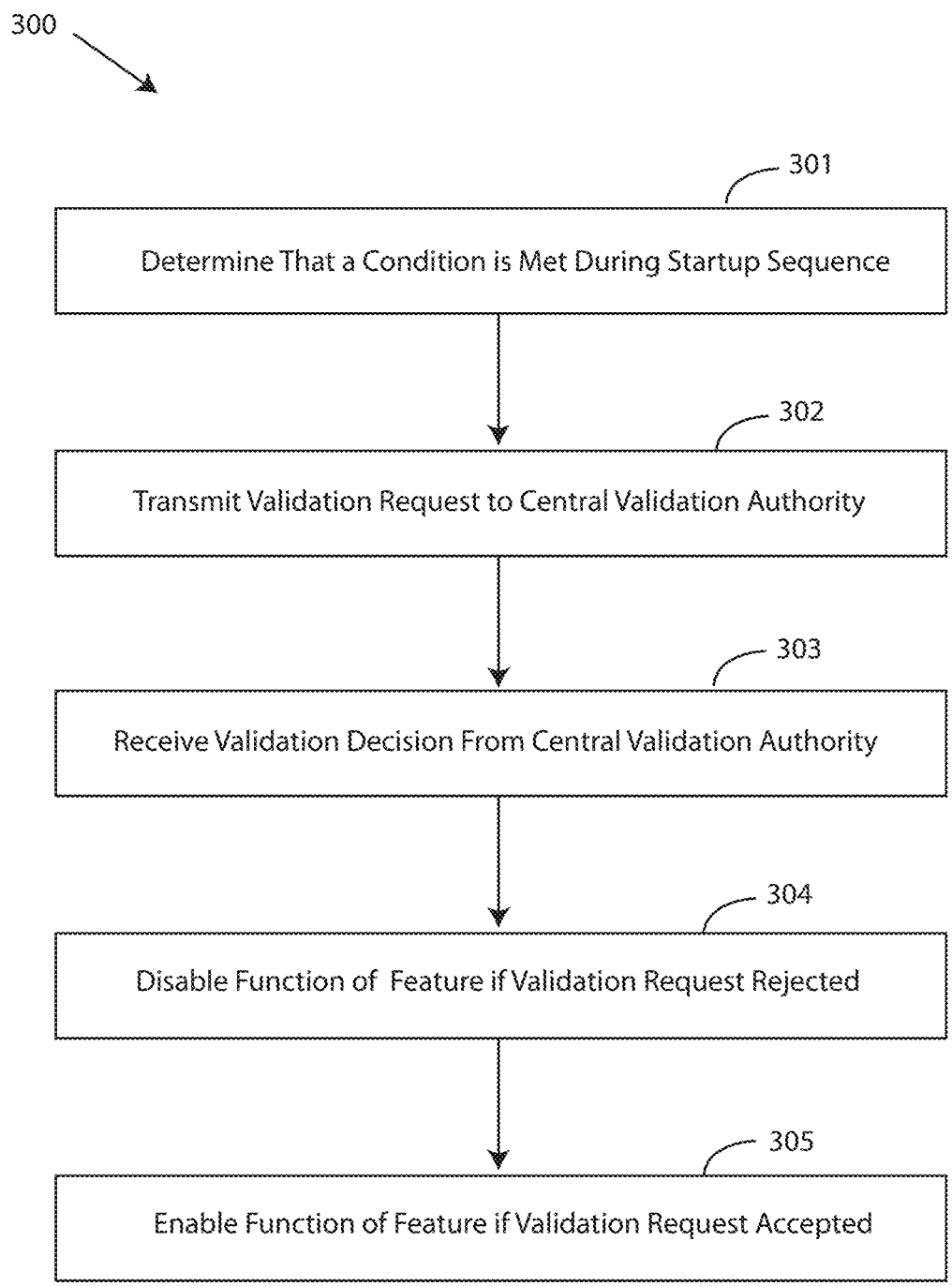
FIG. 6 depicts a flow chart of a method for disabling or enabling a function of a feature of a vehicle based on a validation request to a centralized validation authority, prior to a use of the feature, in accordance with embodiments of the present invention.

Referring now to FIG. 6, which depicts a flow chart of a method 300 for disabling or enabling a function of a feature of a vehicle based on a validation request to a centralized validation authority, prior to a use of the feature, in accordance with embodiments of the present invention. One embodiment of a method 300 or algorithm that may be implemented for disabling or enabling a function of a feature of a vehicle based on a validation request to a centralized validation authority, prior to a use of the feature with the validation system 100 described in FIGS. 1-5 using one or more computer systems as defined generically in FIG. 10 below, and more specifically by the specific embodiments of FIG. 1.

Embodiments of the method 300 for disabling or enabling a function of a feature of a vehicle based on a validation request to a centralized validation authority, prior to a use of the feature, in accordance with embodiments of the present invention, may begin at step 301 wherein a condition is determined to be met, for example, during a startup sequence of a vehicle. Step 302 transmits a validation request to a central validation authority. Step 303 receives a validation decision from the central validation authority. Step 304 disables a function of a feature if the validation request is rejected. Step 305 enables a function of a feature if the validation request is accepted.

Figure 7:
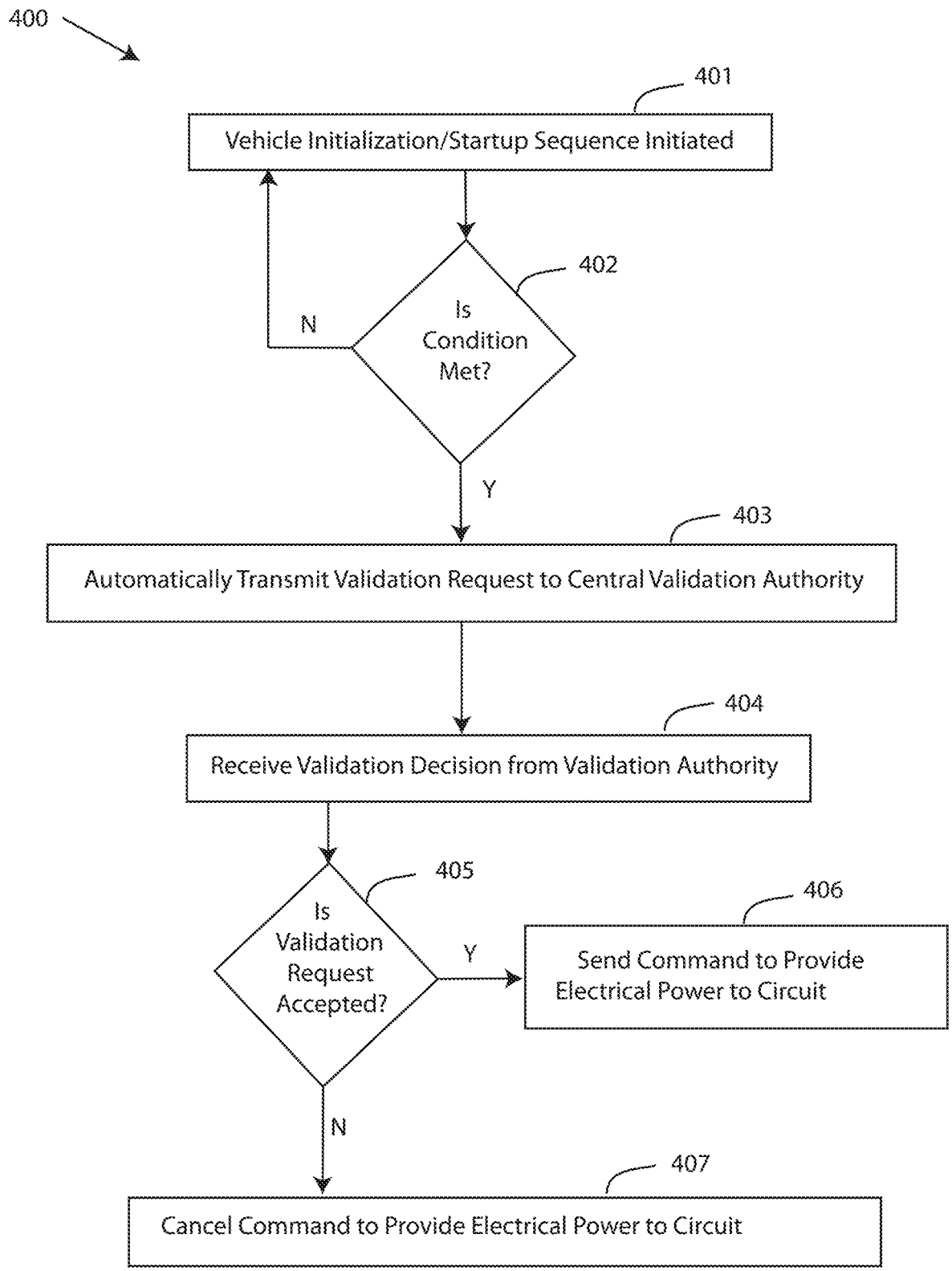
FIG. 7 depicts a detailed flow chart of a method for disabling or enabling a function of a feature of a vehicle based on a validation request to a centralized validation authority, prior to a use of the feature, in accordance with embodiments of the present invention.

FIG. 7 depicts a detailed flow chart of a method 400 for disabling or enabling a function of a feature of a vehicle based on a validation request to a centralized validation authority, prior to a use of the feature, in accordance with embodiments of the present invention. At step 401, a vehicle initialization/startup sequence is initiated. Step 402 determines whether a condition is met. If no condition is met, then the process goes back to step 401. If a condition is met, then step 403 automatically transmits a validation request to central validation authority. Step 404 receives the validation decision from the validation authority. Step 405 determines whether the validation request is accepted. If yes, then step 406 sends a command to provide electrical power to a circuit. If no, then step 407 cancels a command to provide electrical power to the circuit.

Figure 8:
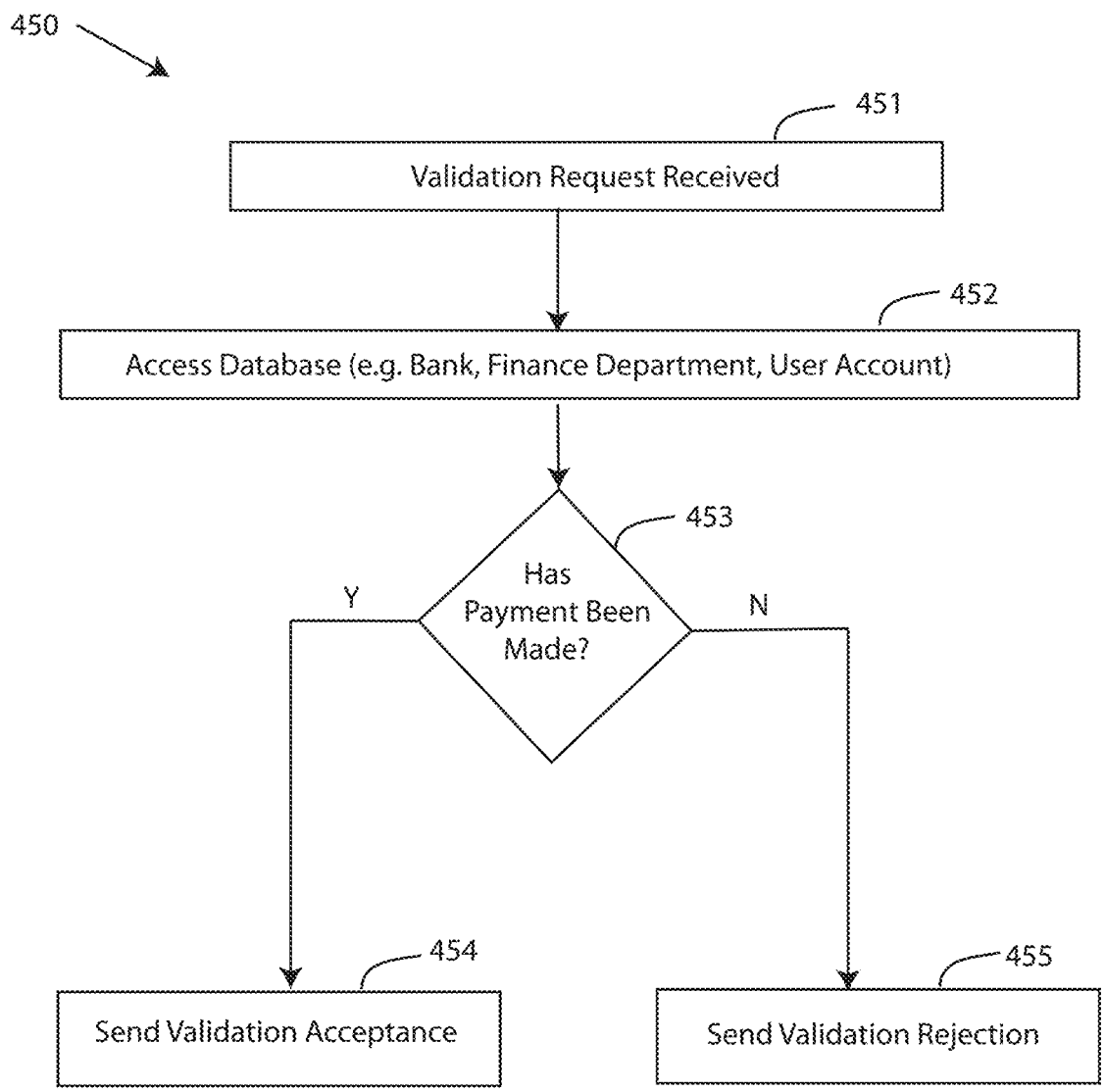
FIG. 8 depicts a flow chart of a method for processing a validation request by the central validation authority related to a payment, in accordance with embodiments of the present invention.
Figure 9:
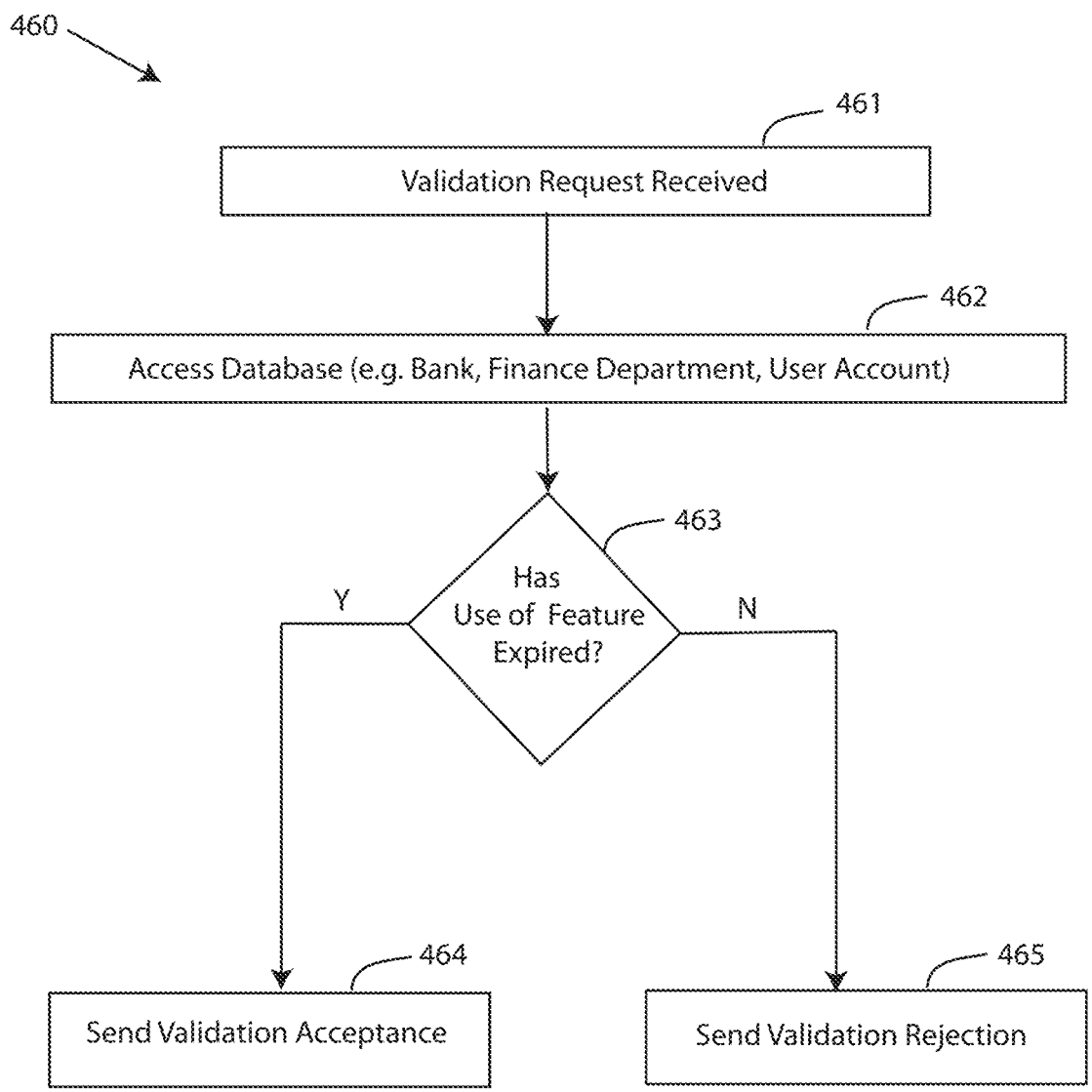
FIG. 9 depicts a flow chart of a method for processing a validation request by the central validation authority related to a usage, in accordance with embodiments of the present invention.

FIG. 8 depicts a flow chart of a method 450 for processing a validation request by the central validation authority relating to a payment, in accordance with embodiments of the present invention. Step 451 receives a validation request. Step 452 accesses a database. Step 453 determines whether a required payment has been made. If not, then step 454 sends a validation acceptance. If yes, then step 455 sends a validation rejection. FIG. 9 depicts a flow chart of a method 460 for processing a validation request by the central validation authority related to a usage, in accordance with embodiments of the present invention. Step 461 receives a validation request. Step 462 accesses a database. Step 463 determines whether a permitted/paid for use of a feature has expired. If not, then step 464 sends a validation acceptance. If yes, then step 465 sends a validation rejection.

Figure 10:
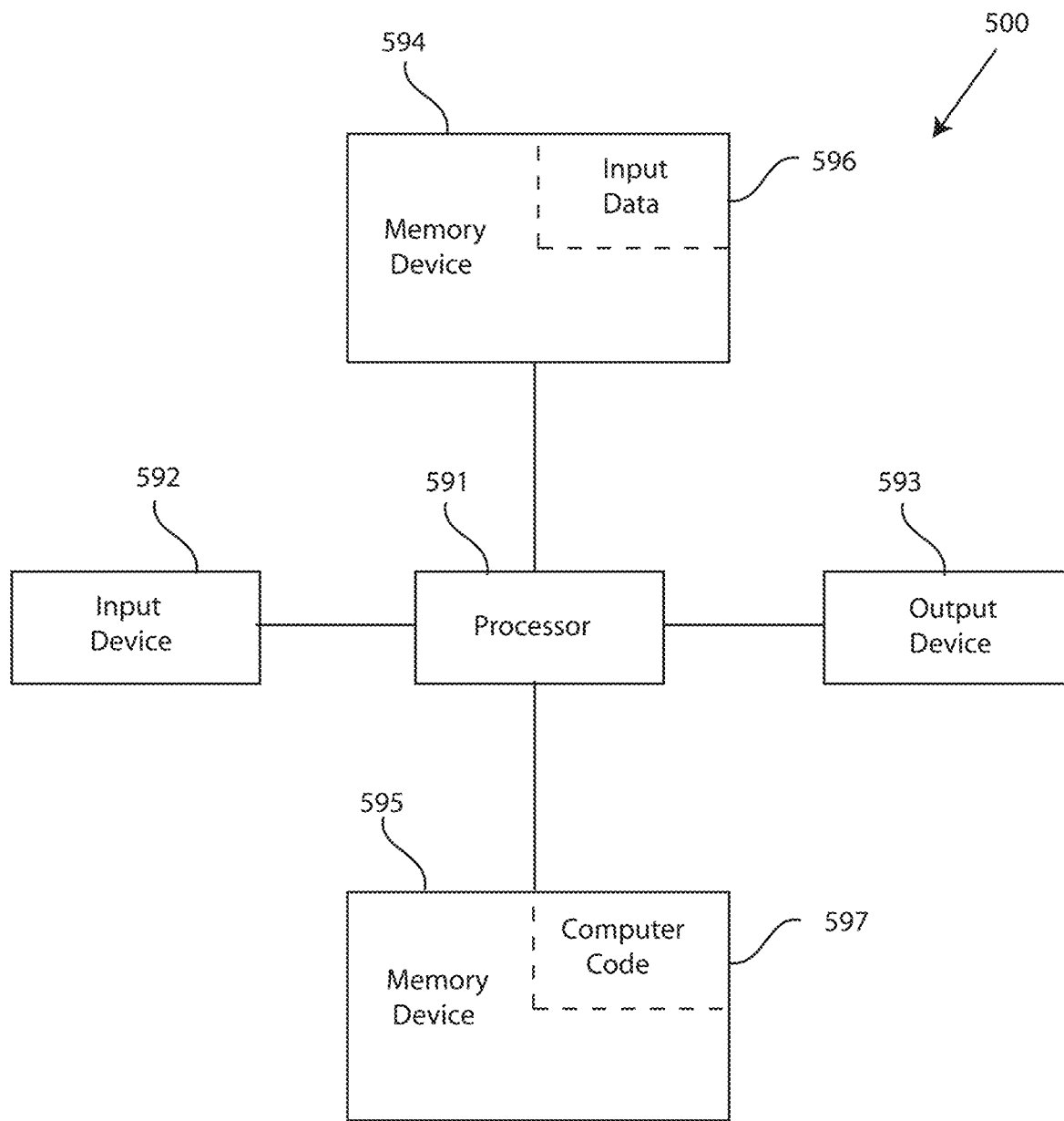
FIG. 10 depicts a block diagram of a computer system for the validation system 100 of FIGS. 1-5, capable of implementing methods method for disabling or enabling a function of a feature based on a validation request to a centralized validation authority, prior to a use of the feature of FIGS. 6-9, in accordance with embodiments of the present invention.

FIG. 10 depicts a block diagram of a computer system for the validation system 100 of FIGS. 1-5, capable of implementing methods method for disabling or enabling a function of a feature based on a validation request to a centralized validation authority, prior to a use of the feature of FIGS. 6-9, in accordance with embodiments of the present invention. The computer system 500 may generally comprise a processor 591, an input device 592 coupled to the processor 591, an output device 593 coupled to the processor 591, and memory devices 594 and 595 each coupled to the processor 591. The input device 592, output device 593 and memory devices 594, 595 may each be coupled to the processor 591 via a bus. Processor 591 may perform computations and control the functions of computer system 500, including executing instructions included in the computer code 597 for the tools and programs capable of implementing a method for disabling or enabling a function of a feature based on a validation request to a centralized validation authority, prior to a use of the feature in the manner prescribed by the embodiments of FIGS. 6-9 using the validation system 100 of FIGS. 1-5, wherein the instructions of the computer code 597 may be executed by processor 591 via memory device 595. The computer code 597 may include software or program instructions that may implement one or more algorithms for implementing the method for disabling or enabling a function of a feature based on a validation request to a centralized validation authority, prior to a use of the feature, as described in detail above. The processor 591 executes the computer code 597. Processor 591 may include a single processing unit, or may be distributed across one or more processing units in one or more locations (e.g., on a client and server).

The memory device 594 may include input data 596. The input data 596 includes any inputs required by the computer code 597. The output device 593 displays output from the computer code 597. Either or both memory devices 594 and 595 may be used as a computer usable storage medium (or program storage device) having a computer-readable program embodied therein and/or having other data stored therein, wherein the computer-readable program comprises the computer code 597. Generally, a computer program product (or, alternatively, an article of manufacture) of the computer system 500 may comprise said computer usable storage medium (or said program storage device).

Memory devices 594, 595 include any known computer-readable storage medium, including those described in detail below. In one embodiment, cache memory elements of memory devices 594, 595 may provide temporary storage of at least some program code (e.g., computer code 597) in order to reduce the number of times code must be retrieved from bulk storage while instructions of the computer code 597 are executed. Moreover, similar to processor 591, memory devices 594, 595 may reside at a single physical location, including one or more types of data storage, or be distributed across a plurality of physical systems in various forms. Further, memory devices 594, 595 can include data distributed across, for example, a local area network (LAN) or a wide area network (WAN). Further, memory devices 594, 595 may include an operating system (not shown) and may include other systems not shown in FIG. 10.

In some embodiments, the computer system 500 may further be coupled to an Input/output (I/O) interface and a computer data storage unit. An I/O interface may include any system for exchanging information to or from an input device 592 or output device 593. The input device 592 may be, inter alia, a keyboard, a mouse, etc. or in some embodiments the touchscreen of a computing device. The output device 593 may be, inter alia, a printer, a plotter, a display device (such as a computer screen), a magnetic tape, a removable hard disk, a floppy disk, etc. The memory devices 594 and 595 may be, inter alia, a hard disk, a floppy disk, a magnetic tape, an optical storage such as a compact disc (CD) or a digital video disc (DVD), a dynamic random access memory (DRAM), a read-only memory (ROM), etc. The bus may provide a communication link between each of the components in computer 500, and may include any type of transmission link, including electrical, optical, wireless, etc.

An I/O interface may allow computer system 500 to store information (e.g., data or program instructions such as program code 597) on and retrieve the information from computer data storage unit (not shown). Computer data storage unit includes a known computer-readable storage medium, which is described below. In one embodiment, computer data storage unit may be a non-volatile data storage device, such as a magnetic disk drive (i.e., hard disk drive) or an optical disc drive (e.g., a CD-ROM drive which receives a CD-ROM disk). In other embodiments, the data storage unit may include a knowledge base or data repository 125 as shown in FIG. 1.

As will be appreciated by one skilled in the art, in a first embodiment, the present invention may be a method; in a second embodiment, the present invention may be a system; and in a third embodiment, the present invention may be a computer program product. Any of the components of the embodiments of the present invention can be deployed, managed, serviced, etc. by a service provider that offers to deploy or integrate computing infrastructure with respect to validation systems and methods. Thus, an embodiment of the present invention discloses a process for supporting computer infrastructure, where the process includes providing at least one support service for at least one of integrating, hosting, maintaining and deploying computer-readable code (e.g., program code 597) in a computer system (e.g., computer system 500) including one or more processor(s) 591, wherein the processor(s) carry out instructions contained in the computer code 597 causing the computer system to disable or enable a function of a feature based on a validation request to a centralized validation authority, prior to a use of the feature. Another embodiment discloses a process for supporting computer infrastructure, where the process includes integrating computer-readable program code into a computer system 500 including a processor.

The step of integrating includes storing the program code in a computer-readable storage device of the computer system 500 through use of the processor. The program code, upon being executed by the processor, implements a method for disabling or enabling a function of a feature based on a validation request to a centralized validation authority, prior to a use of the feature. Thus, the present invention discloses a process for supporting, deploying and/or integrating computer infrastructure, integrating, hosting, maintaining, and deploying computer-readable code into the computer system 500, wherein the code in combination with the computer system 500 is capable of performing a method for disabling or enabling a function of a feature based on a validation request to a centralized validation authority, prior to a use of the feature.

A computer program product of the present invention comprises one or more computer-readable hardware storage devices having computer-readable program code stored therein, said program code containing instructions executable by one or more processors of a computer system to implement the methods of the present invention.

A computer system of the present invention comprises one or more processors, one or more memories, and one or more computer-readable hardware storage devices, said one or more hardware storage devices containing program code executable by the one or more processors via the one or more memories to implement the methods of the present invention.

The present invention may be a system, a method, and/or a computer program product at any possible technical detail level of integration. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
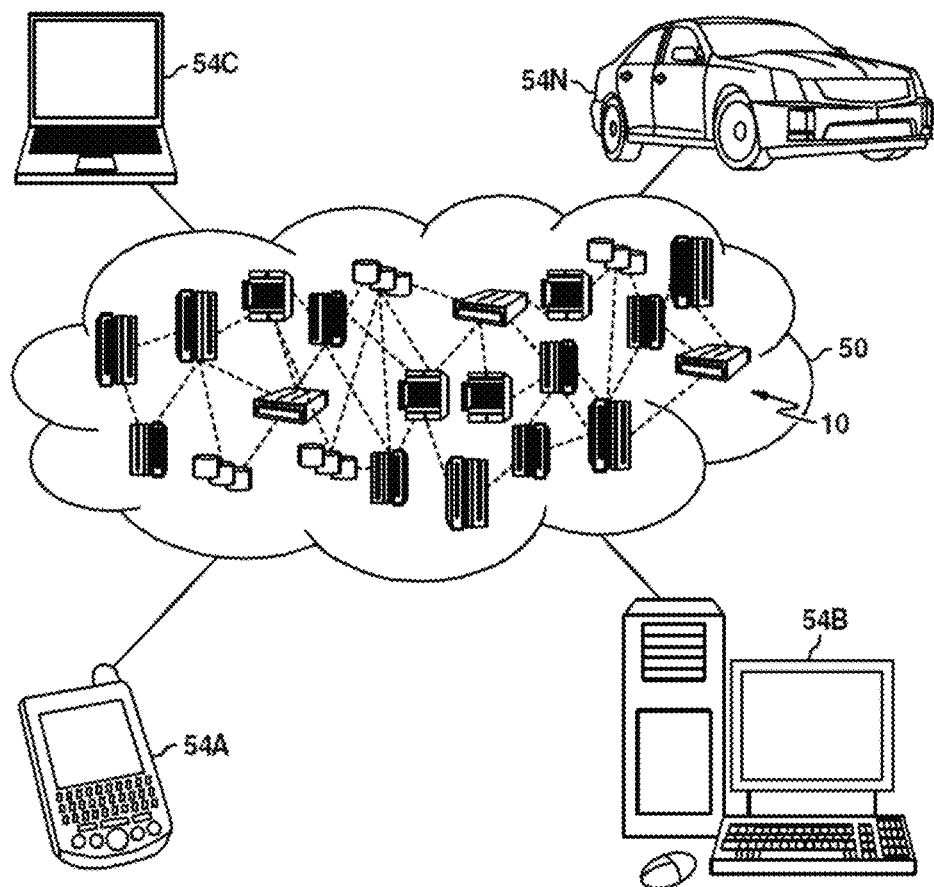
FIG. 11 depicts a cloud computing environment, in accordance with embodiments of the present invention.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A, 54B, 54C and 54N shown in FIG. 11 are intended to be illustrative only and that computing nodes 10 and cloud computing environment 50 can communicate with any type of computerized device over any type of network and/or network addressable connection (e.g., using a web browser).

Figure 12:
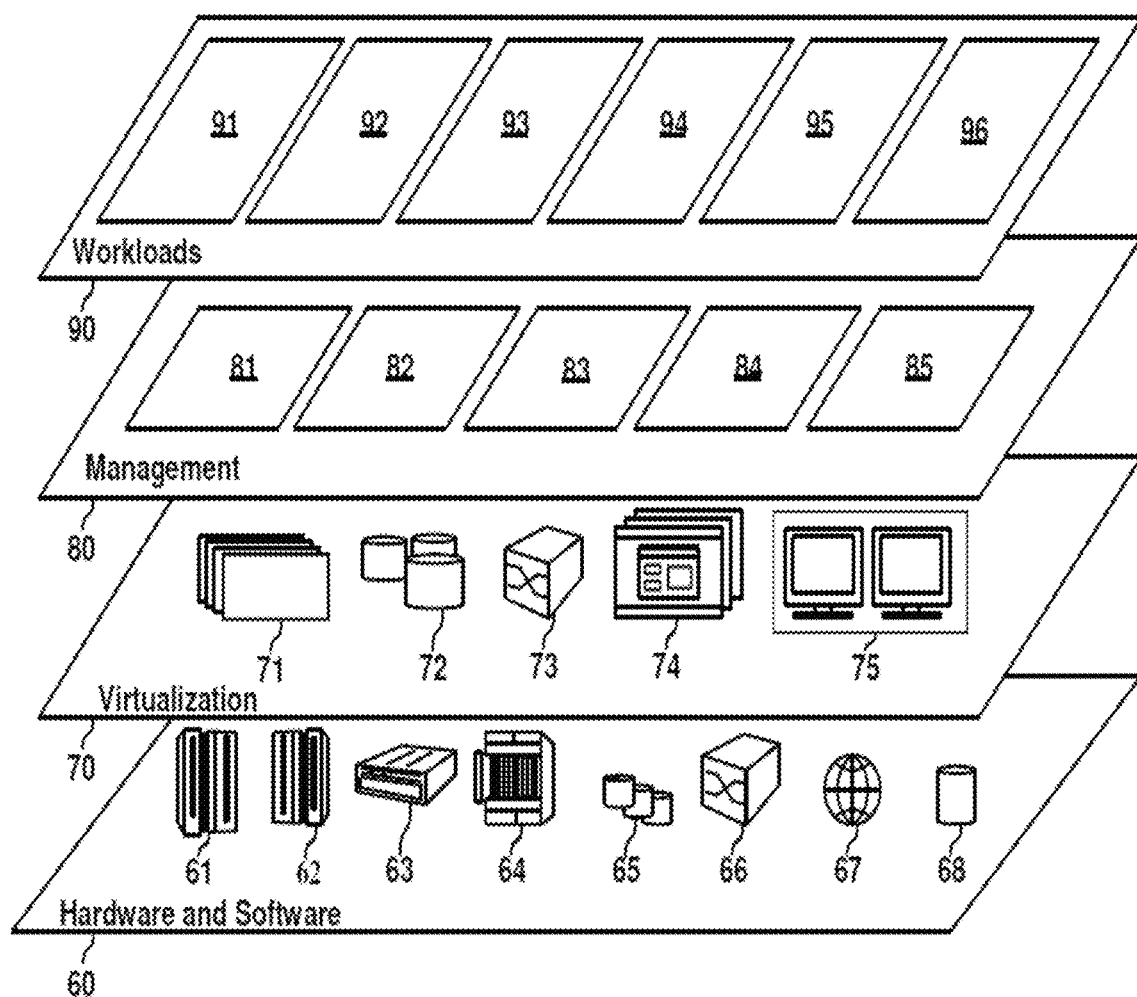
FIG. 12 depicts abstraction model layers, in accordance with embodiments of the present invention.

Referring now to FIG. 12, a set of functional abstraction layers provided by cloud computing environment 50 (see FIG. 11) are shown. It should be understood in advance that the components, layers, and functions shown in FIG. 12 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and GUI and disabling or enabling based on a remote validation 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein

What is claimed is:

1. A method comprising:
    determining, by a processor of a computing system, that a condition is met as part of a startup sequence of the vehicle;
    transmitting, by the processor, a validation request to a central validation authority using a vehicle-to-vehicle network, in response to determining the condition is met, wherein the validation request is part of the startup sequence of the vehicle;
    receiving, by the processor, a validation decision from a centralized validation authority via the vehicle-to-vehicle network; and
    disabling, by the processor, the feature of the vehicle as a function of receiving the validation decision.

2. The method of claim 1, wherein the disabling the feature includes cancelling a command to provide electrical power to an electrical circuit that controls an operation of the feature of the vehicle.

3. The method of claim 1, wherein the condition is selected from the group consisting of: a period of days from a previous validation request sent to the centralized validation authority, and a usage of the vehicle.

4. The method of claim 1, further comprising:
    detecting, by the processor, that the vehicle cannot connect to the Internet to transmit the validation request directly to the central validation authority;
    locating, by the processor, a nearest vehicle that has a connection to the Internet; and
    sending, by the processor, the validation request to the nearest vehicle over the vehicle-to-vehicle-network, wherein the nearest vehicle:
        transmits the validation request to the centralized validation authority on behalf of the vehicle over the Internet,
        receives the validation decision from the centralized validation authority over the Internet, and
        sends the validation decision to the vehicle over the vehicle-to-vehicle network.

5. The method of claim 1, wherein the feature of the vehicle is an onboard entertainment system, an engine, a navigation software, a satellite radio, a streaming service, car electronics, and an electronic control unit.

6. The method of claim 1, wherein the determining that the condition is met includes, checking, by the processor, a counter that tracks a number of predetermined days since a previous validation request, the number of predetermined days representing a billing cycle.

7. The method of claim 1, wherein a validation acceptance is received when the centralized validation authority verifies that a payment has made to maintain a use of the feature of the vehicle, and a validation rejection is received when the centralized validation authority verifies that a payment has not been made to maintain a use of the feature.

8. The method of claim 1, further comprising:
    determining, by the processor, that an additional condition is met as part of a startup sequence of the vehicle;
    receiving, by the processor, a validation acceptance to an additional validation request sent by from the vehicle; and
    enabling, by the processor, an additional feature of the vehicle as a function of receiving the validation acceptance.

9. A computing system, comprising:
    a processor;
    a memory device coupled to the processor; and
    a computer readable storage device coupled to the processor, wherein the storage device contains program code executable by the processor via the memory device to implement a method comprising:
        determining, by the processor, that a condition is met as part of a startup sequence of the vehicle;
        transmitting, by the processor, a validation request to a central validation authority using a vehicle-to-vehicle network, in response to determining the condition is met, wherein the validation request is part of the startup sequence of the vehicle;
        receiving, by the processor, a validation decision from a centralized validation authority via the vehicle-to-vehicle network; and
        disabling, by the processor, the feature of the vehicle as a function of receiving the validation decision.

10. The computing system of claim 9, wherein the disabling the feature includes cancelling a command to provide electrical power to an electrical circuit that controls an operation of a feature of the vehicle.

11. The computing system of claim 9, wherein the condition is selected from the group consisting of: a period of days from a previous validation request sent to the centralized validation authority, and a usage of the vehicle.

12. The computing system of claim 9, further comprising:
    detecting, by the processor, that the vehicle cannot connect to the Internet to transmit the validation request directly to the central validation authority;
    locating, by the processor, a nearest vehicle that has a connection to the Internet; and
    sending, by the processor, the validation request to the nearest vehicle over the vehicle-to-vehicle-network, wherein the nearest vehicle:
        transmits the validation request to the centralized validation authority on behalf of the vehicle over the Internet,
        receives the validation decision from the centralized validation authority over the Internet, and
        sends the validation decision to the vehicle over the vehicle-to-vehicle network.

13. The computing system of claim 9, wherein the determining that the condition is met includes, checking, by the processor, a counter that tracks a number of predetermined days since a previous validation request, the number of predetermined days representing a billing cycle.

14. The computing system of claim 9, wherein a validation acceptance is received when the centralized validation authority verifies that a payment has made to maintain a use of the feature of the vehicle, and a validation rejection is received when the centralized validation authority verifies that a payment has not been made to maintain a use of the feature.

15. A computer program product, comprising a computer readable hardware storage device storing a computer readable program code, the computer readable program code comprising an algorithm that when executed by a computer processor of a computing system implements a method for disabling a function of a feature of a vehicle based on a validation request to a centralized validation authority, prior to a use of the feature, the method comprising:
- determining, by the processor, that a condition is met as part of a startup sequence of the vehicle;
- transmitting, by the processor, a validation request to a central validation authority using a vehicle-to-vehicle network, in response to determining the condition is met, wherein the validation request is part of the startup sequence of the vehicle;
- receiving, by the processor, a validation decision from a centralized validation authority via the vehicle-to-vehicle network; and
- disabling, by the processor, the feature of the vehicle as a function of receiving the validation decision.

16. The computer program product of claim 15, wherein the disabling the feature includes cancelling a command to provide electrical power to an electrical circuit that controls an operation of the feature of the vehicle.

17. The computer program product of claim 15, wherein the condition is selected from the group consisting of: a period of days from a previous validation request sent to the centralized validation authority, and a usage of the vehicle.

18. The computer program product of claim 15, further comprising:
- detecting, by the processor, that the vehicle cannot connect to the Internet to transmit the validation request directly to the central validation authority;
- locating, by the processor, a nearest vehicle that has a connection to the Internet; and
- sending, by the processor, the validation request to the nearest vehicle over the vehicle-to-vehicle-network, wherein the nearest vehicle:
  - transmits the validation request to the centralized validation authority on behalf of the vehicle over the Internet,
  - receives the validation decision from the centralized validation authority over the Internet, and
  - sends the validation decision to the vehicle over the vehicle-to-vehicle network.

19. The computer program product of claim 15, wherein the determining that the condition is met includes, checking, by the processor, a counter that tracks a number of predetermined days since a previous validation request, the number of predetermined days representing a billing cycle.

20. The computer program product of claim 15, wherein a validation acceptance is received when the centralized validation authority verifies that a payment has made to maintain a use of the feature of the vehicle, and a validation rejection is received when the centralized validation authority verifies that a payment has not been made to maintain a use of the feature.

* * * * *